US012387047B2

(12) United States Patent
Porter et al.

(10) Patent No.: US 12,387,047 B2
(45) Date of Patent: Aug. 12, 2025

(54) SEMANTIC FRAME IDENTIFICATION USING CAPSULE NETWORKS

(71) Applicant: Cognizer, Inc., Pleasanton, CA (US)

(72) Inventors: Jack Porter, Mountain House, CA (US); Soundararajan Velu, Bangalore North (IN); Vineeth Thanikonda Munirathnam, Bangalore (IN); Suzanne M. Kirch, Bedford, MA (US); Rajiv Baronia, San Ramon, CA (US)

( * ) Notice: Subject to any disclaimer, the term of this patent is extended or adjusted under 35 U.S.C. 154(b) by 245 days.

(21) Appl. No.: 17/928,770

(22) PCT Filed: Jun. 1, 2021

(86) PCT No.: PCT/US2021/035297
§ 371 (c)(1),
(2) Date: Nov. 30, 2022

(87) PCT Pub. No.: WO2021/247610
PCT Pub. Date: Dec. 9, 2021

(65) Prior Publication Data
US 2023/0214598 A1 Jul. 6, 2023

(51) Int. Cl.
*G06F 40/30* (2020.01)
*G06F 40/284* (2020.01)
*G06F 40/40* (2020.01)

(52) U.S. Cl.
CPC ............ *G06F 40/30* (2020.01); *G06F 40/284* (2020.01); *G06F 40/40* (2020.01)

(58) Field of Classification Search
CPC ........ G06F 40/30; G06F 40/284; G06F 40/40; G06F 40/211; G06F 40/216; G06F 40/279; G06N 3/045; G06N 3/08
See application file for complete search history.

(56) References Cited

U.S. PATENT DOCUMENTS

| | | | | |
|---|---|---|---|---|
| 9,262,406 | B1 * | 2/2016 | Das | G06F 40/151 |
| 11,538,468 | B2 * | 12/2022 | Teserra | G10L 15/26 |
| 11,783,173 | B2 * | 10/2023 | Hakkani-Tur | G10L 15/22 706/25 |
| 11,797,610 | B1 * | 10/2023 | Ferrucci | G06F 40/30 |
| 2021/0342540 | A1 * | 11/2021 | Firat | G06F 16/353 |
| 2022/0245179 | A1 * | 8/2022 | Dernoncourt | G06F 16/338 |
| 2022/0284190 | A1 * | 9/2022 | Alonichau | G06F 40/30 |

* cited by examiner

*Primary Examiner* — Stella L. Woo
(74) *Attorney, Agent, or Firm* — Bryan Fibel

(57) ABSTRACT

Semantic frame identification involves associating identified target words in the sentential context of their natural language source with semantic frames from a frame lexical database. The disclosed invention leverages the CapsNet architecture for improved semantic frame identification of a target word in a natural language input. This includes deriving the features of a target word identified in the sentence and extracting the features of the word units and the thematic words around the target word. Through dynamic routing of capsules, the CapsNet is able to filter the candidate frames for the target word to reduce the search space and apply the CapsNet prediction to identify a frame from a frame lexical database.

20 Claims, 3 Drawing Sheets

300

Embedding vector [200] [101] [12] [1450] ... [0] [0]  310

Input Sentence [John] [read] [a] [book] ... [...] [...]  305

400

SEMANTIC FRAME IDENTIFICATION USING CAPSULE NETWORKS

CROSS REFERENCE TO RELATED APPLICATIONS

This application claims priority from provisional U.S. patent application No. 63/033,202 filed on Jun. 1, 2020 and provisional U.S. patent application No. 63/059,958 filed on Jul. 31, 2020.

FIELD OF THE INVENTION

Embodiments of the invention generally relate to natural language processing, more particularly, to the usage of capsule networks for frame semantic parsing.

BACKGROUND

Semantic parsing is the task of transforming natural language text into a machine readable formal representation. Natural language processing (NLP) involves the use of artificial intelligence to process and analyze large amounts of natural language data. In natural language processing, semantic role labeling is the process of labeling words in a sentence to indicate their semantic role in the sentence. More specifically, frame semantic parsing has gained traction in recent years, where it uses the lexical information defined in FrameNet to first associate identified target words in the sentential context of their natural language source with semantic frames. This frame identification reduces the number of suitable semantic roles in the subsequent semantic role labeling step, thus improving the efficiency of the process. Better understanding of text through frame identification also results in improved question answering and text summarization.

The FrameNet database contains over 1,200 semantic frames, which defines various situations represented by language. A single frame can correlate with many words and a single word can correlate with many frames. For example, the word 'book,' has several definitions which correspond to different frames. This includes 'records,' 'arrest,' 'reserve,' and other frames related to synonyms of 'book.'

Other semantic frame parsing methods identify a target word in a sentence and then search through the FrameNet dataset and find the first match with the target. This method does not take into consideration the target within the context of the sentence and can result in wrong frame selection. Other implementations using Long Short Term Memory (LSTM) and Bidirectional Encoder Representations from Transformers (BERT), trained and tested only on a few domain specific datasets, do not generalize as well with real world applications varying across multiple unknown domains. Bidirectional LSTMs consist of a pair of LSTMs, where one is trained from left-to-right to predict the next word and the other is trained from right-to-left to predict the previous word. However, because they are two separate LSTMs, neither of them look at both directions at the same time and thus are not truly bidirectional. BERT consists of a series of transformers and is bidirectional, using self-attention. Attention in transformers is computed top-down, so the nodes in the higher layer can ignore some of the nodes in the lower layer.

Capsule Neural Networks (CapsNet) are machine learning systems that model hierarchical relationships. CapsNets were introduced in the image classification domain, where they are configured to receive as input an image and to process the image to perform image classification or object detection tasks. CapsNet improves on Convolutional Neural Networks (CNN) through the addition of the capsule structure and is better suited to outputting the orientation of an observation and pose of an observation compared to CNN. Thus, it can train on a comparatively lesser number of data points with a better performance in solving the same problem. The dynamic routing algorithm groups capsules together to activate higher level parent capsules. Over the course of iterations, each parent's outputs may converge with some children's predictions and diverge from those of others, thus removing many unnecessary activations in the network, ultimately until the capsules reach an agreement.

SUMMARY

Semantic frame identification involves associating identified target words in the sentential context of their natural language source with semantic frames from a frame lexical database. The disclosed invention leverages the CapsNet architecture for improved semantic frame identification of a target word in a natural language input. This includes deriving the features of a target word identified in the sentence and extracting the features of the word units and the thematic words around the target word. Through dynamic routing of capsules, the CapsNet is able to filter the candidate frames for the target word to reduce the search space and apply the CapsNet prediction to identify a frame from a frame lexical database.

A computer-implemented method for identifying a semantic frame of a target word in a natural language text is provided. This includes receiving, into a neural capsule embedding network as input, an embedding vector, where the embedding vector contains embeddings representing words in a natural language text, analyzing, by the neural capsule embedding network, the context of a target word within the embedding vector considering tokens to the left and right of the target word, through dynamic routing of capsules, by the neural capsule embedding network, converging to a final capsule layer, each capsule mapping to a semantic frame, generating, from the neural capsule embedding network output, a frame vector, wherein the frame vector contains a value for each frame, and identifying a semantic frame, from a frame database, corresponding to the frame having the highest value in the frame vector. The frame vector can be a frame probability vector such that the value for each frame is the probability that the target word corresponds to that frame, and the semantic frame is identified from the frame database corresponding to the frame having the highest probability in the frame probability vector.

The input can be a natural language text, where the words in the natural language text are converted into embeddings and inserted into an embedding vector during preprocessing. The target word in the natural language text can be identified during preprocessing. The features of the natural language text can be identified during preprocessing. The features can be included in the embedding vector as embedding features. The features can also be identified by the Neural Capsule Embedding Network.

BRIEF DESCRIPTION OF THE DRAWINGS

The accompanying drawings taken in conjunction with the detailed description will assist in making the advantages and aspects of the disclosure more apparent.

DETAILED DESCRIPTION OF THE INVENTION

Figure 1:
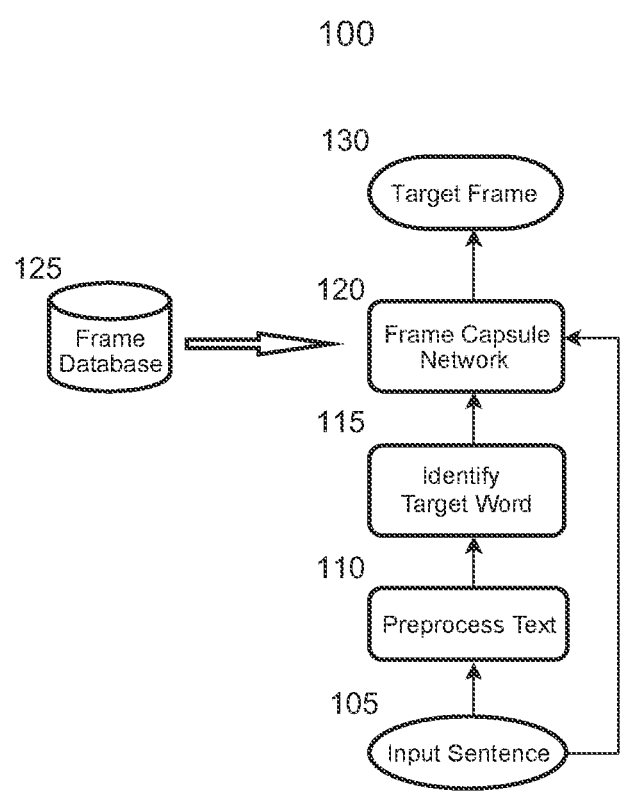
FIG. 1 depicts a system configured to identify a semantic frame corresponding to a target word in a natural language input.

Reference will now be made in detail to the present embodiments discussed herein, illustrated in the accompanying drawings. The embodiments are described below to explain the disclosed method, system, apparatus, and program by referring to the Figures using like numerals.

The subject matter is presented in the general context of program modules and/or in computer hardware, including the structures disclosed in this specification and their structural equivalents, or in combinations of one or more of them. Those skilled in the art will recognize that other implementations may be performed in combination with other types of program and hardware modules that may include different data structures, components, or routines that perform similar tasks. The invention can be practiced using various computer system configurations and across one or more computers, including but not limited to clients and servers in a client-server relationship. Computers encompass all kinds of apparatus, devices, and machines for processing data, including by way of example one or more programmable processors, memory, and can optionally include, in addition to hardware, computer programs and the ability to receive data from or transfer data to, or both, mass storage devices. A computer program, which may also be referred to or described as a program, software, a software application, an app, a module, a software module, a script, or code, can be written in any form of programming language, including compiled or interpreted languages, or declarative or procedural languages; it can be deployed in any form, including as a stand-alone program or as a module, component, subroutine, or other unit suitable for use in a computing environment deployed or executed on one or more computers.

Unless otherwise defined, all terms (including technical and scientific terms) used herein have the same meaning as commonly understood by one having ordinary skill in the art to which this invention belongs. In describing the invention, it will be understood that a number of techniques and steps are disclosed. Each of these has individual benefits, and each can also be used in conjunction with one or more, or in some cases all, of the other disclosed techniques. Accordingly, for the sake of clarity, this description will refrain from repeating every possible combination of the individual steps in an unnecessary fashion. The specification and claims should be read with the understanding that such combinations are entirely within the scope of the invention and the claims.

It will nevertheless be understood that no limitation of the scope is thereby intended, such alterations and further modifications in the illustrated invention, and such further applications of the principles as illustrated therein being contemplated as would normally occur to one skilled in the art to which the embodiments relate. The present disclosure is to be considered as an exemplification of the invention, and is not intended to limit the invention to the specific embodiments illustrated by the figures or description below.

System, method, apparatus, and program instruction for semantic frame identification using Capsule Networks is provided. Such an invention allows for the more efficient processing of natural language data. The disclosed invention leverages the CapsNet architecture for improved semantic frame identification of a target word in a natural language input. This is done by deriving the features of a target word identified in the sentence and extracting the features of the word units and the thematic words around the target word. The CapsNet is able to filter the candidate frames for the target word to reduce the search space and transform the derived features into a feature vector and apply the CapsNet prediction. An explanation for identifying a frame from a frame lexical database based on the identified target word in the context of the sentence using CapsNet follows.

As illustrated in FIG. 1, a disclosed system 100, configured to identify a semantic frame, is provided. Such a system can have installed on it software, firmware, hardware, or a combination of them that in operation causes the system to perform operations or actions. The system receives as input a natural language input 105 stored in memory or accessed from another computer. This disclosure contemplates different natural language text lengths and formats as input. The input sentence in the depicted embodiment is an example and no limitation is intended. The input sentence is preprocessed 110 using different NLP libraries to identify the target word 115 from the sentence. While other semantic role labeling or semantic parsing models use the word "predicate" as the target of the semantic role labeling or semantic parsing, it should be understood that the target word, as described here, can be any word in the input, and as such is not limited to verbs. In the preferred embodiment, the input is preprocessed 110 using different NLP libraries to identify features of the natural language text that will be provided to and used by the CapsNet, including linguistic features of the text. Instead of assuming that the model can pick up all of the features on its own, the inclusion of linguistic features in the capsules ensures that the model can use all of the features to better identify a semantic frame. The text is fed through parsers to determine these linguistic features, including, but not limited to, syntactic features like constituency tree path, dependency features like tense and active/passive form, and semantic features like named entity recognition.

The identified target and the sentence can be inputted into the Frame Capsule Network 120. The Frame Capsule Network 120 considers the context of the target word and the context of the whole sentence to activate higher capsule layers. The Frame Capsule Network's highest and final layers map to each of the frames in a frame database 125 for retrieval of the target frame corresponding to the target word. Although configured for the FrameNet database, the system can be configured for use with other frame, semantic role, or similar databases, registries or other datastores. Other embodiments may vary in whether the database 125 is located on the same physical device, integrated programmatically, or connected via a network. In the preferred embodiment, the system outputs a target frame 130 from the FrameNet database corresponding to the target word.

Figure 2:
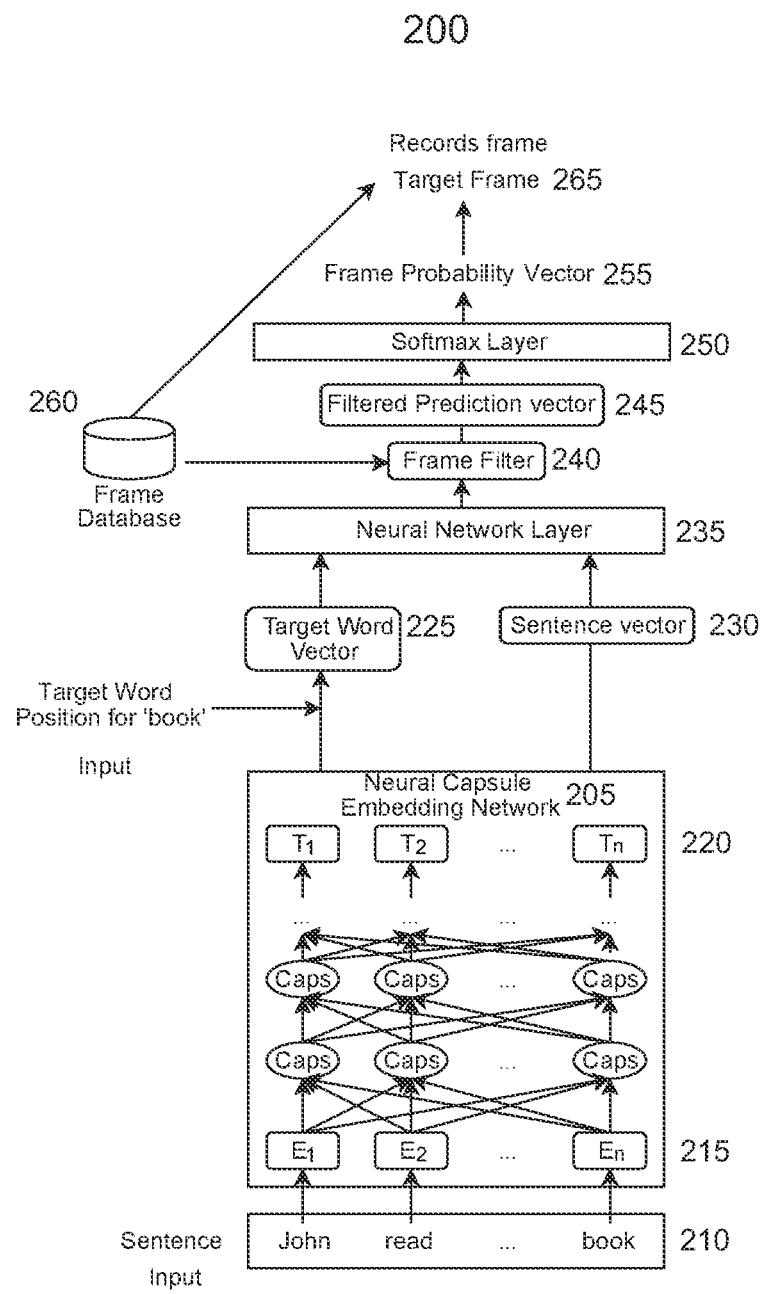
FIG. 2 depicts a Frame Capsule Network embodiment configured to identify a semantic frame corresponding to a target word in a natural language input.

As illustrated in FIG. 2, a Frame Capsule Network embodiment 200, configured to identify a semantic frame, is provided. A Frame Capsule Network appropriately configured in accordance with this specification, can perform the disclosed processes and steps. An embodiment of the Frame Capsule Network can include a Neural Capsule Embedding Network 205 and a series of layers and filters, including but not limited to, a Neural Network Layer 235, a Frame Filter 240, and a Softmax Layer 250. The processes and steps described below can be performed by one or more computers or computer components or one or more computer or computer components executing one or more computer programs to perform functions by operating on input and generating output.

Figures 3, 4:
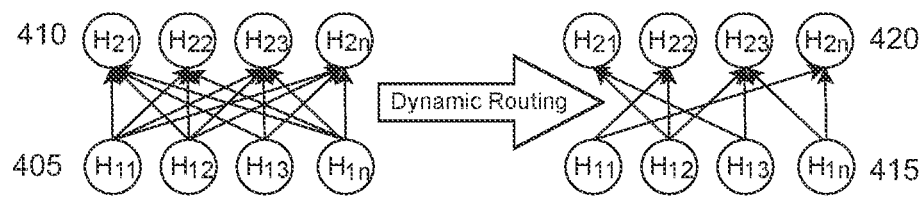
FIG. 3 depicts words in an input sentence converted to numerical representations called embeddings.
FIG. 4 depicts the dynamic routing of capsules between layers in a capsule network.

In the depicted embodiment, the Neural Capsule Embedding Network 205 is a CapsNet configured to receive a natural language sentence 210 as input. This disclosure contemplates different natural language text lengths and formats as input. The input sentence in the depicted embodiments is an example and no limitation is intended. Natural language sentences are comprised of text, exemplified by the sentence "John read a book." Because neural networks cannot read and understand text, the data is converted into numerical representations called embeddings 215. As illustrated in FIG. 3, the process 300 whereby each word in the input sentence ("John read a book") 305 passed to a Neural Capsule Embedding Network is first converted to embeddings ($E_x$) 310 is provided. In the preferred embodiment, the Neural Capsule Embedding Network is designed to accept a vector length of 512 embeddings ($I_L$). When receiving an input sentence less than 512 words in length, embeddings following the sentence (that do not correspond to a word) are populated with the value of zero. Thus, for the example sentence, "John read a book," four embeddings having values corresponding to the words and 508 embeddings having value 0, comprise the embedding vector. This disclosure contemplates Neural Capsule Embedding Networks having different maximum and minimum length embedding vectors as well as those capable of receiving variable length embedding vectors. This disclosure contemplates the conversion of natural language data 305 to embeddings 310 by the Neural Capsule Embedding Network or as part of preprocessing where the Neural Capsule Embedding Network would receive the embedding vector as input. The conversion of natural language data to embeddings can be local to the Neural Capsule Embedding Network 205 or separate. The format of the embedding vector can vary to additionally include the target word or other values that the system may use (with appropriate delimiters), but should contain the words of the sentence as embedding tokens.

Embodiments can vary in whether features, to be evaluated by the Neural Capsule Embedding Network, are identified during pre-processing or by the Neural Capsule Embedding Network itself. In the preferred embodiment, the features of the text are identified during pre-processing and fed into the model through the embedding vector. The features are converted to numerical representations and included with each word embedding that the feature is relevant to, as feature embeddings, such that each embedding in the embedding vector is itself a vector. For each word, any feature embeddings for features that are not relevant to a word are populated with the value of zero in order for the embedding vector for each word to be the same dimension. Alternatively, the linguistic features can be identified in the first step in the CapsNet.

A Neural Capsule Embedding Network 205 is comprised of stacked layers of capsules, where each capsule is initially linked to every other capsule in the adjacent layers, though these connections are pared down as a result of dynamic routing. The Neural Capsule Embedding Network 205 is a true CapsNet and not merely a limited number of capsule layers. In the preferred embodiment, the maximum number of layers is 30. This disclosure contemplates Neural Capsule Embedding Networks of other sizes and across one or more computers. The network is configured for each token to analyze and consider the tokens on both the left and right sides of the current token to fully understand the context within the sentence. In the preferred embodiment, 10 tokens to the left (before) and 10 tokens to the right (after) are considered, via capsule connections. This is an improvement over prior art processes which do not look at the words in both directions or, in implementations using Bidirectional LSTMs, that look to the left and right of the word separately and are not truly bidirectional. In the preferred embodiment, each capsule layer in the network has a hidden size of 2048 ($H_L$), though other sizes may be contemplated. Upon receiving the input, an intermediate hidden neural layer converts the input embedding size of $I_L$ to hidden size of $H_L$ and projects it to the hidden capsule layers. The network is configured to produce, for an input sentence, a contextual output matrix (O) of dimension $I_L \times H_L$. The network is trained on a corpus of text to produce this output. Training is done by passing a known input, generating an output using the network as it currently is, then comparing it to the known correct output, and modifying the parameters (weights) accordingly to improve the accuracy of the results. Over time, the network is trained to generate the known output for all natural language data input.

As depicted in FIG. 4, dynamic routing of capsule networks 400 is the process whereby connections between lower level and higher level capsules are activated based on relevance to each other. Before dynamic routing, each capsule in a lower layer 405 is connected to each capsule in the layer above 410. Over the course of learning, extraneous connections between capsules in a lower layer 415 and a higher layer 420 are identified and removed so that only the relevant connections remain. Capsules in a capsule layer can activate depending on their input data. Upon activation, the output of a lower capsule is routed to one or more capsules in the succeeding higher layer, abstracting away information while proceeding bottom-up. Capsules in a given capsule layer are configured to receive, as input, capsule outputs of one or more capsules of a previous capsule layer. The dynamic routing algorithm determines how to route outputs between capsule layers of the capsule network. As the capsules independently agree and converge to activate fewer and fewer higher level parent capsules, the overall complexity of the network at higher levels is reduced. Note that in CapsNet, the higher layer capsules do not know what they represent in advance, so there is no prior assumption regarding the representations of higher layer capsules. Whereas for other architectures, such as those based on transformers, all layers have the same number of nodes, and the number of nodes is precisely the number of input tokens.

CapsNets are commonly employed in image recognition and classification due to their understanding of the spatial relationships of features in an image. For the image recognition process, CapsNet architecture involves capsules that take into consideration things like color, gradients, edges, shapes, and spatial orientation to identify object features and recognize the position and location of the features. As capsules agree on the features of the image, the output is routed to subsequent layers to the eventual identification of the image.

For semantic frame identification, the disclosed CapsNet is trained to analyze the input by evaluating linguistic features of the target word in the context of the sentence, such features including, but not limited to, syntactic features like constituency tree path, dependency features like tense and active/passive form, and semantic features like named entity recognition. As capsules agree on the relevant features for identifying the frame of the target word, the output is routed to subsequent layers to the eventual last and highest frame capsule layer of the network. Dynamic routing of capsule networks ensures that connections between higher layer and lower layer capsules are based on relevance to each other, thus removing all irrelevant activations and reducing the overall complexity of the network. In the depicted embodiment, at the final capsule layer 220, the Neural Capsule Embedding Network 205 outputs a target word vector 225 and a sentence vector 230, though the Neural Capsule Embedding Network 205 can be configured to produce other outputs.

A target word vector 225 of dimension $1 \times H_L$ can be obtained by evaluating the matrix multiplication of the target word position vector of dimension $1 \times I_L$ and the output (O) of dimension $I_L \times H_L$, where the target word position vector is obtained by setting the values at the position of the target words to ones and setting everything else to zero. Similarly, a sentence vector 230 of dimension $1 \times H_L$ is obtained by evaluating the matrix multiplication of the context position vector of dimension $1 \times I_L$ and the output (O), where the context position vector is obtained by setting a window of values before and after the position of a target word to one and setting everything else to zero. In the preferred embodiment, the window for the context position vector is defined as 10 to make sure all the tokens related to the target words are captured. This window corresponds to the number of tokens to the left (before) and tokens to the right (after) of the current token that are considered by the network.

In the depicted embodiment, the output from the Neural Capsule Embedding Network 205 can be passed through one or more layers and filters to generate a frame vector, which in the preferred embodiment is a frame probability vector. The layers and filters perform post processing on the output from the Neural Capsule Embedding Network to improve the efficiency of frame identification and no limitation is intended. The functionality performed can occur on one or more computers, components, or program modules and can reside local to the Neural Capsule Embedding Network 205 or separate. Both the sentence vector 230 and target word vector 225 are appended and passed through a Neural Network Layer 235 to output a $1 \times 2^*H_L$ dimensional output vector. This $1 \times 2^*H_L$ dimensional vector is passed through a fully connected layer consisting of k nodes, where k is the number of frames in FrameNet or similar database 260. This produces a $1 \times k$ dimensional frame vector, where each value corresponds to a frame in the frame database. The Neural Network Layer performs a function that transforms the values in the vector, where the values can vary depending on the function used. In the preferred embodiment, until the Neural Network Layer 235, each value is from −1 to 1, and the Neural Network Layer is the activation function layer and post processing, which normalizes the values to 0 to 1. A frame filter 240 can set all the values of non-candidate frames, i.e. frames that do not contain the target word, to zero. The result from passing the output through the frame filter is the filtered prediction vector 245, where only the candidate frames, i.e. frames that do contain the target word, remain, and these values will be greater than 0. The frame filter improves the efficiency of the model, but for new words that do not appear in any frames, it will filter out all frames. Lastly, in the preferred embodiment, a Softmax layer 250 normalizes the values to produce a k-dimensional frame probability distribution, though probabilities can be created through mathematical calculations without the use of a Softmax layer. In other embodiments, the frame vector values are not converted to probabilities.

In the preferred embodiment, the output of the Frame Capsule Network is $1 \times k$ vector of frame probabilities 255, where each entry in the vector is the probability that the corresponding frame is the actual semantic frame for the target word. The frame having the highest probability can be retrieved from the frame database 260 and is identified as the target frame 265 corresponding to the target word. In the example sentence, "John read a book," the frame 'records' has the highest probability and is identified as the target frame. In other embodiments, where the vector values are not converted to probabilities, the frame having the highest vector value is identified as the target frame corresponding to the target word.

The preceding description contains embodiments of the invention and no limitation of the scope is thereby intended. It will be further apparent to those skilled in the art that various modifications and variations can be made in the present invention without departing from the spirit or scope of the invention.

The invention claimed is:

1. A computer-implemented method for identifying a semantic frame of a target word in a natural language text, comprising:
   receiving, into a neural capsule embedding network as input, an embedding vector, wherein the embedding vector contains embeddings representing words in a natural language text;
   analyzing, by the neural capsule embedding network, the context of a target word within the embedding vector considering tokens to the left and right of the target word;
   through dynamic routing of capsules, by the neural capsule embedding network, converging to a final capsule layer, each capsule mapping to a semantic frame;
   generating, from the neural capsule embedding network output, a frame vector, wherein the frame vector contains a value for each frame;
   identifying a semantic frame, from a frame database, corresponding to the frame having the highest value in the frame vector.

2. The method of claim 1, wherein the frame vector is a frame probability vector such that the value for each frame is the probability that the target word corresponds to that frame and the semantic frame is identified from the frame database corresponding to the frame having the highest probability in the frame probability vector.

3. The method of claim 2, wherein generating, from the neural capsule embedding network output, a frame probability vector includes normalizing values to produce a frame probability distribution.

4. The method of claim 1 further comprising:
   before receiving, into a neural capsule embedding network as input, an embedding vector:
   a) receiving, as input, a natural language text;
   b) converting words in the natural language text into embeddings and inserting the embeddings into an embedding vector.

5. The method of claim 4, wherein converting words in the natural language text into embeddings includes populating, with the value of zero, any embeddings in the vector that do not correspond to a word.

6. The method of claim 1, further comprising:
   after receiving, into a neural capsule embedding network as input, an embedding vector, deriving, by the neural capsule embedding network, features of each word in the context of the natural language text.

7. The method of claim 1 further comprising:
before receiving, into a neural capsule embedding network as input, an embedding vector:
a) receiving, as input, a natural language text;
b) preprocessing the natural language text to identify features of the natural language text;
c) converting words in the natural language text into embeddings and inserting the embeddings into an embedding vector.

8. The method of claim 1 further comprising:
before receiving, into a neural capsule embedding network as input, an embedding vector:
a) receiving, as input, a natural language text;
b) preprocessing the natural language text to identify features of the natural language text;
c) converting words in the natural language text into embeddings and inserting the embeddings into an embedding vector;
d) inserting the features as feature embeddings into the embedding vector.

9. The method of claim 1 further comprising:
before receiving, into a neural capsule embedding network as input, an embedding vector:
a) receiving, as input, a natural language text;
b) preprocessing the natural language text to identify a target word;
c) converting words in the natural language text into embeddings and inserting the embeddings into an embedding vector.

10. The method of claim 1 further comprising:
before receiving, into a neural capsule embedding network as input, an embedding vector:
a) receiving, as input, a natural language text;
b) preprocessing the natural language text to identify a target word and identify features of the natural language text;
c) converting words in the natural language text into embeddings and inserting the embeddings into an embedding vector;
d) inserting the features as feature embeddings into the embedding vector.

11. A computer-implemented method for identifying a semantic frame of a target word in a natural language text, comprising:
receiving, into a neural capsule embedding network, as input, a natural language text;
converting words in the natural language text into embeddings, wherein the embeddings represent words in a natural language text, and inserting the embeddings into an embedding vector;
analyzing, by the neural capsule embedding network, the context of a target word within the embedding vector considering tokens to the left and right of the target word;
through dynamic routing of capsules, by the neural capsule embedding network, converging to a final capsule layer, each capsule mapping to a semantic frame;
generating, from the neural capsule embedding network output, a frame vector, wherein the frame vector contains a value for each frame;
identifying a semantic frame, from a frame database, corresponding to the frame having the highest value in the frame vector.

12. The method of claim 11, wherein the frame vector is a frame probability vector such that the value for each frame is the probability that the target word corresponds to that frame and the semantic frame is identified from the frame database corresponding to the frame having the highest probability in the frame probability vector.

13. The method of claim 12, wherein generating, from the neural capsule embedding network output, a frame probability vector includes normalizing values to produce a frame probability distribution.

14. The method of claim 11 further comprising:
before receiving, into a neural capsule embedding network as input, a natural language text:
a) receiving, as input, a natural language text;
b) preprocessing the natural language text to identify features of the natural language text.

15. The method of claim 11, further comprising:
after receiving, into a neural capsule embedding network as input, an natural language text, deriving, by the neural capsule embedding network, features of each word in the context of the natural language text.

16. A system for identifying a semantic frame of a target word in in a natural language text, comprising at least one processor, the at least one processor configured to cause the system to at least perform:
receiving, into a neural capsule embedding network as input, an embedding vector, wherein the embedding vector contains embeddings representing words in a natural language text;
analyzing, by the neural capsule embedding network, the context of a target word within the embedding vector considering tokens to the left and right of the target word;
through dynamic routing of capsules, by the neural capsule embedding network, converging to a final capsule layer, each capsule mapping to a semantic frame;
generating, from the neural capsule embedding network output, a frame vector, wherein the frame vector contains a value for each frame;
identifying a semantic frame, from a frame database, corresponding to the frame having the highest value in the frame vector.

17. The system of claim 16, wherein the frame vector is a frame probability vector such that the value for each frame is the probability that the target word corresponds to that frame and the semantic frame is identified from the frame database corresponding to the frame having the highest probability in the frame probability vector.

18. The system of claim 16 further comprising:
before receiving, into a neural capsule embedding network, an embedding vector as input:
a) receiving, as input, a natural language text;
b) converting words in the natural language text into embeddings and inserting the embeddings into an embedding vector.

19. The system of claim 16, further comprising:
after receiving, into a neural capsule embedding network as input, an embedding vector, deriving, by the neural capsule embedding network, features of each word in the context of the natural language text.

20. The system of claim 16 further comprising:
before receiving, into a neural capsule embedding network as input, an embedding vector:
a) receiving, as input, a natural language text;
b) preprocessing the natural language text to identify features of the natural language text;
c) converting words in the natural language text into embeddings and inserting the embeddings into an embedding vector.

* * * * *